May 12, 1964
C. B. DAVIDS
3,132,525
TELEMECHANICAL STRESS DEVICE
Filed Feb. 5, 1962
2 Sheets-Sheet 1
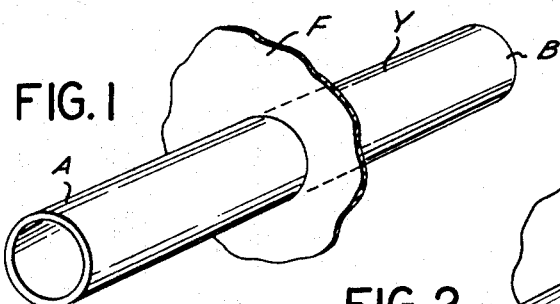
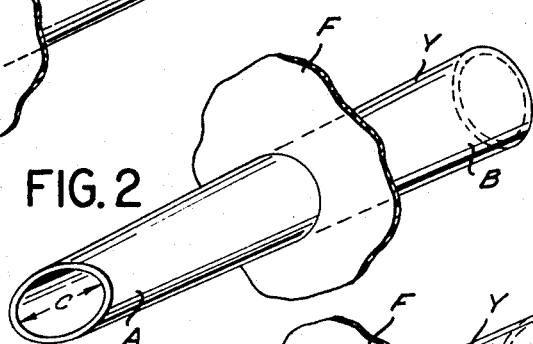
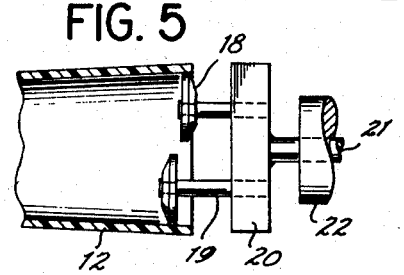
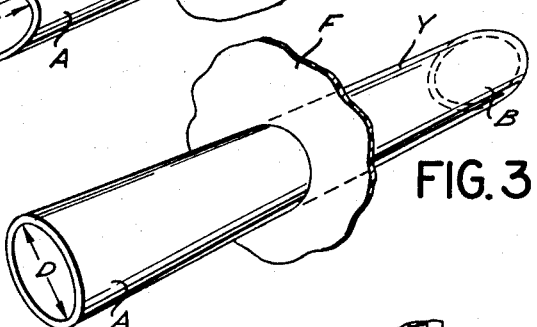
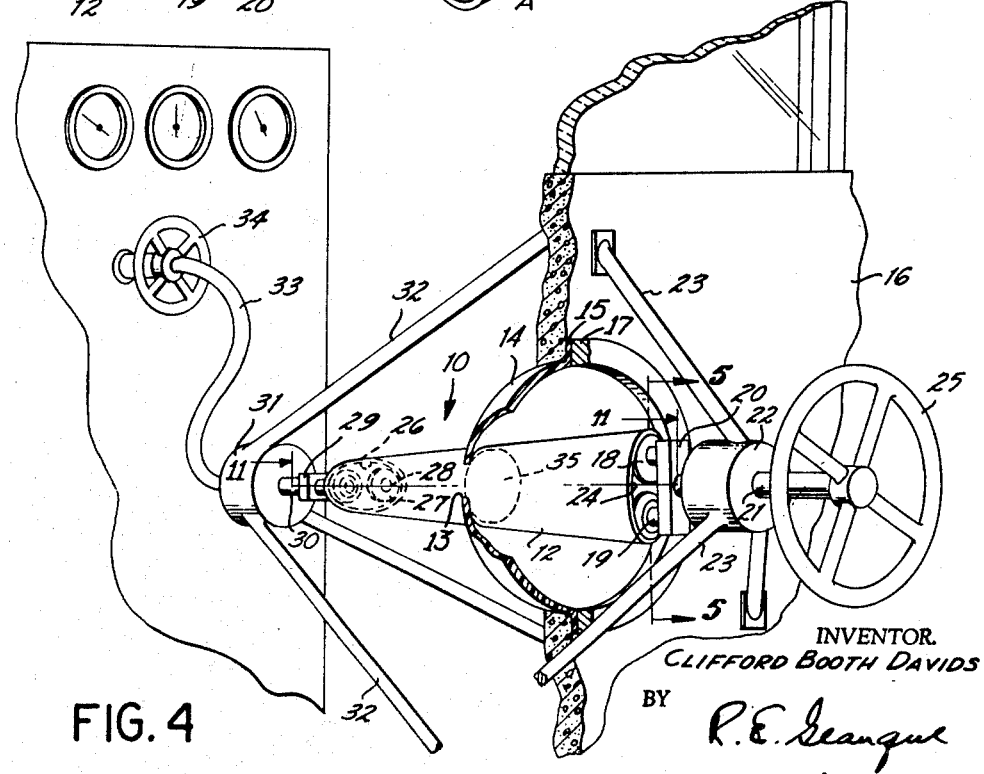
INVENTOR.
CLIFFORD BOOTH DAVIDS
BY
R. E. Jeanque
ATTORNEY May 12, 1964  C. B. DAVIDS  3,132,525
TELEMECHANICAL STRESS DEVICE
Filed Feb. 5, 1962  2 Sheets-Sheet 2
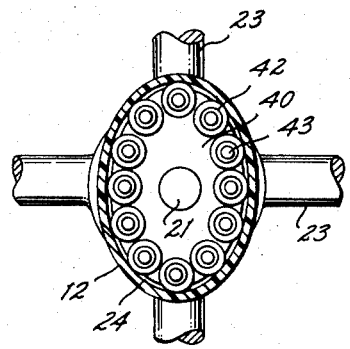
FIG. 6
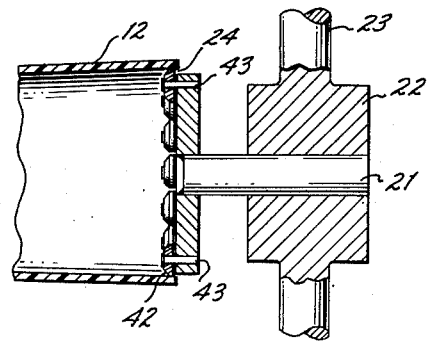
FIG. 7
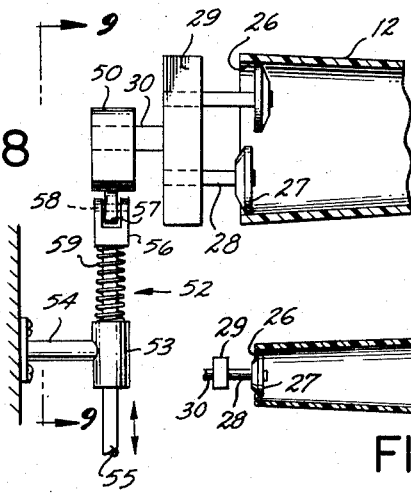
FIG. 8
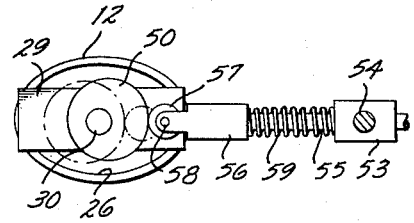
FIG. 9
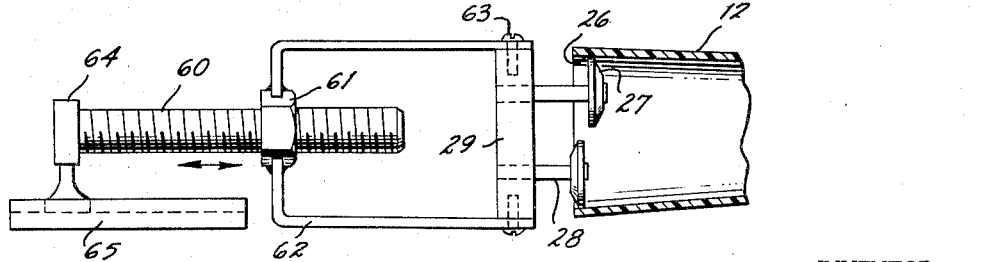
FIG. 11
FIG. 10
INVENTOR.
CLIFFORD BOOTH DAVIDS
BY
R. E. Geangue
ATTORNEY

United States Patent Office 3,132,525
Patented May 12, 1964

3,132,525
TELEMECHANICAL STRESS DEVICE
Clifford Booth Davids, Woodland Hills, Calif., assignor to The Marquardt Corporation, Van Nuys, Calif., a corporation of California
Filed Feb. 5, 1962, Ser. No. 170,931
11 Claims. (Cl. 74—17.8)

This invention relates to force and motion transmitting devices and more particularly to a telemechanical stress device for transmitting force and motion through a continuous boundary wall without the use of dynamic seals.

Rotary motion and reciprocating devices operate on the principle of relative motion between a member supporting the force transmitting means between its driven end and its other end. When the supported member also serves as a barrier to seal the driving end from the other end, dynamic seals must be employed. This creates a number of problems—viz., some media are virtually impossible to hold with a seal, the seals are expensive, they eventually wear out and leak and they must be made with precision and close tolerance. When the barrier is employed to isolate the driven end of the shaft from its output end to prevent highly corrosive materials from passing through the barrier, satisfactory seals are very difficult to obtain. The device of the present invention, on the other hand, eliminates the necessity of using any type of dynamic sealing arrangement by employing a rigid connection between the barrier wall and the force transmitting member.

In view of the foregoing factors and conditions characteristic of force transmitting devices employing dynamic seals, it is a primary object of the present invention to provide a new and useful force and motion transmitting device not subject to the disadvantages enumerated above and having an impervious, rigid connection with a boundary wall which eliminates the need of dynamic seals.

Another object of the invention is to provide a simple, lightweight, reliable device of the type described employing the phenomenon that a force and deflection imparted to one end of a cylindrical, flexible tube which is restrained about its midsection results in a force and deflection at the other end of the tube which lies normal to the induced force and deflection.

Still another object of the invention is to provide a device of the type described capable of transmitting motion through a barrier by mounting a tube in the barrier and revolving tube deforming means in the input end of the tube to transmit force to a force receiving means at the output end of the tube.

A further object of the invention is to provide a device of the type described for transmitting a torque through a continuous panel without the use of a dynamic seal.

Yet another object of the invention is to provide a device of the type described wherein a deformable tube is rigidly mounted in a barrier wall by means of a diaphragm intermediate its ends and is adapted and arranged to receive a deformation at its input end and transmit it to its output end to reciprocate a member mounted adjacent thereto.

Another object of the invention is to provide a device of the type described wherein a deformable tube is rigidly mounted in a barrier wall by means of a diaphragm intermediate its ends and is adapted and arranged to receive a deformation at its input end which is transmitted by the tube through the barrier wall to impart rotary motion to a shaft mounted at the output end of the tube.

These and other more specific objects will appear upon reading the following specification and claims and upon considering in connection therewith the attached drawings to which they relate.

Referring now to the drawings in which preferred embodiments of the invention are illustrated:

FIGURE 1 is a perspective view of a deformable tube rigidly mounted in a continuous boundary wall;

FIGURE 2 is a perspective view of the tube of FIGURE 1 shown deflected in a first direction;

FIGURE 3 is a perspective view of the tube of FIGURE 1 shown deflected in a second direction;

FIGURE 4 is a perspective view of a device of the invention shown in one operative form;

FIGURE 5 is an elevational view, partly in cross section, taken along line 5—5 of FIGURE 4 on an enlarged scale to show a detail of construction;

FIGURE 6 is a transverse cross-sectional view of a modified form of tube deforming means of the invention;

FIGURE 7 is a longitudinal cross-sectional view of the tube deforming means shown in FIGURE 6;

FIGURE 8 is an elevational view, partly in cross section, of a modified form of the device of FIGURE 4;

FIGURE 9 is an end view taken along line 9—9 of FIGURE 8;

FIGURE 10 is an elevational view, partly in cross-section, of another modified form of the device of FIGURE 4; and FIGURE 11 is a longitudinal, cross-sectional view, with parts shown in elevation, taken along line 11—11 of FIGURE 4.

Referring again to the drawings and particularly to FIGURES 1-3, the device of the present invention takes advantage of the phenomenon that a force and deflection imposed at one end (A) of a cylindrical tube Y which is rigidly mounted in a continuous barrier wall F is transmitted in the form of a stress through the tube Y and results in a force and deflection at the other end (B) of tube Y which is normal to the imposed force and deflection. When a force C spreads the encompassing wall of the end A of the tube Y horizontally, as shown in FIGURE 2, the end B is deformed in a vertical plane. Deforming of the end A vertically, as shown at D in FIGURE 3, results in a deforming of the end B in a horizontal plane.

Referring now to FIGURES 4, 5, and 11, the static force transmitting device of the present invention, generally designated 10, includes a tube or cylindrical member 12 rigidly mounted in the aperture 13 of a diaphragm 14 by any suitable means, such as by fusing the tube 12 to aperture 13 on both sides of diaphragm 14 so that tube 12 is restrained about its periphery. The diaphragm 14 includes an annular flange 15 and is rigidly mounted in a barrier wall 16 by means of a collar 17 which secures flange 15 to wall 16. Tube deforming rollers 18 are disposed in one end 24 of tube 12 and are rotatably mounted on shafts 19 which are rigidly affixed to a block 20. The block 20 is rigidly affixed to a shaft 21 which, in turn, is rotatably mounted in a bearing 22. A plurality of struts 23 rigidly mount the bearing 22 on the wall 16. A hand wheel 25 may be employed to rotate the shaft 21 to revolve block 20 whereby the rollers 18 will revolve about the inner periphery of the tube 12. It is to be understood that a similar function could be obtained by rollers located on the outer periphery of tube 12. The distance between the contacting edges of the rollers 18 is greater than the inside diameter of the tube 12 and the rollers 18 deform the tube into a permanent elliptical or oval shape. As the rollers 18 revolve about the inner wall of end 24 of the cylinder 12, the deformation of the end 24 progresses about the outer periphery of the end 24 and induces a stress in the tube 12 which is transmitted through the diaphragm 14 to the end 26 of the tube 12.

A plurality of rollers 27 are rotatably mounted on shafts 28 which are rigidly affixed to a block 29. The block 29 is rigidly affixed to a shaft 30 which is journaled in a suitable bearing 31. The bearing 31 is rigidly affixed by means of struts 32 to the wall 16. The transmitted, progressive elliptical deformation of tube 12 causes the rollers 27 to revolve around the inner periphery of end 26, thereby revolving block 29 and rotating shaft 30. One end of a flexible drive 33 may be affixed to the output end of shaft 30 and the other end of the flexible drive 33 may be affixed to a hand wheel 34 for the purpose of controlling it from a remote location.

The diaphragm 14 is made of relatively thin, flexible material so that it will facilitate transmission of the motion along the tube 12. The diaphragm 14 also includes a plane 35 located within the tube 12 and the diaphragm supports the tube 12 in such a manner that flexing of the diaphragm 14 accommodates the progressive deformation of the tube. The plane 35 comprises a circular disc which is secured, as by fusing, to the inner wall of tube 12 so that the diaphragm 14 provides a positive, impervious seal preventing the environment within the chamber housing wheel 34 from passing through the wall 16.

Of course, it is apparent that the diaphragm 14, including plane 35, and the tube 12 may be integrally formed by molding or by forming them from a single stock of material instead of fusing the tube 12 to aperture 13 and plane 35, as described herein.

Referring to FIGURES 6 and 7, a modified driving arrangement is employed to deform end 24 of tube 12 comprising an elliptically shaped cam 40 which is rigidly affixed to the shaft 21 and is wider across its greater dimension than the diameter of the tube 12 so that the tube 12 will be permanently deformed thereby. A plurality of rollers 42 may be rotatably mounted on pins 43 which are spaced around cam 40 to minimize friction as the cam 40 is revolved about the inside periphery of end 24 of the tube 12. The elliptically shaped cam 40 is especially useful where it is desired to lock the shaft 21 against rotation by deflection of the end 26 of tube 12.

FIGURES 8 and 9 show a modified form of the invention wherein the flexible cable 33 may be replaced with an eccentric 50 which is rigidly mounted on shaft 30. A spring-biased, reciprocating member 52 is rigidly mounted subjacent the eccentric 50 and includes a bushing 53 which is rigidly affixed to an arm 54. A shaft 55 is slidably mounted in bushing 53 and carries a bifurcated member 56 at its upper end. A roller 57 is rotatably mounted on a shaft 58 of the bifurcated member 56 and is maintained in contact with the eccentric 50 by means of a compression spring 59 which encircles shaft 55 abutting the bifurcated member 56 at one end and the bushing 53 at its other end. Deformation of the end 26 of tube 12 rotates the eccentric 50 which causes the shaft 55 to reciprocate. Of course it is apparent that the reciprocating member 52 may be mounted directly under and in contact with, the end 26 of the tube 12 and may be made to reciprocate by cyclically deforming the end 24 of the tube 12 in a horizontal plane.

FIGURE 10 shows another modification wherein a threaded shaft 60 may be forced to move horizontally. The shaft 60 threadedly engages a nut 61 which is rigidly affixed to a bail 62. The bail 62 may be attached to block 29 by means of screws 63. Deformation of the output end 26 of tube 12 imparts rotation to the nut 61 through rollers 27, block 29 and bail 62. Rotation of the nut 61 while the shaft 60 is prevented from rotating by means of the bracket 64, which is affixed to shaft 60 and slidably mounted in way 65, causes the shaft 60 to move in the direction of its longitudinal axis.

Operation of the device will be described in connection with the embodiment shown in FIGURES 4, 5 and 11. Assuming that it is desirable to operate the hand wheel 34 from a remote location and that the wall 16 must be employed to isolate the wheel 34. The diaphragm 14 mounts the force transmitting mechanism 10 within the wall 16 in such a manner that the output end 26 of the tube 12 will be located within the isolated area and the input end 24 of the tube will be located on the other side of the wall 16 outside the isolated environment. Rotation of the hand wheel 25 causes the shaft 21 to rotate revolving block 20 carrying the rollers 18 about the inner periphery of the end 24 of tube 12. This causes the elliptical or oval deformation of the tube to proceed about the tube in such a manner that a force and deformation is transmitted to output end 26 of the tube. As the elliptical or oval deformation travels about the output end 26 of tube 12, the rollers 27 will be forced to travel about the inner wall of the output end 26 of the tube 12 causing block 29 to revolve imparting rotation to shaft 30 which, in turn, causes flexible shaft 33 to rotate and turn hand wheel 34.

Although the particular telemechanical stress devices herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:
1. A device for transmitting force and motion through a continuous boundary wall comprising:
   a tubular member extending through said wall and being affixed thereto intermediate its ends;
   driving means mounted adjacent one end of said tubular member for deforming said one end; and
   driven means mounted adjacent the other end of said tubular member and adapted to be driven by the force transmitted through said wall by the deformation of said one end.

2. A device for transmitting a force through an impervious barrier comprising:
   a cylindrical tube extending through said barrier and being rigidly affixed to a flexible portion thereof intermediate its ends;
   a first tube deforming roller means mounted at one end of said tube in such a manner that said first tube deforming roller means deforms said one end of said tube into a first oval shape;
   means rigidly connected to said first tube deforming roller means for revolving said first tube deforming roller means whereby said first oval deformation travels about said one end of said tube;
   a second tube deforming roller means mounted at the other end of said tube in such a manner that said second tube deforming roller means deforms said other end of said tube into a second oval shape lying at right angles to said first oval shape; and
   means rigidly connected to said second tube deforming means for converting an oval path of revolution of said second tube deforming roller means into rotary motion.

3. A device for transmitting motion through a solid barrier comprising:
   tubular means extending through an opening in said barrier;
   a diaphragm rigidly mounted in said opening and encompassing said tubular means for peripherally restraining said tubular means and forming an impervious seal in said opening;
   said tubular means having a first tube portion extending on one side of said diaphragm and
   a second tube portion extending on the other side of said diaphragm in axial alignment with said first tube portion;
   tube deforming means mounted in engagement with one end of said first tube portion for cyclically deforming said one end; and
   an output member mounted adjacent said second tube portion at right angles to said tube deforming means for movement by said second tube portion when said one end of said first tube portion is cyclically deformed.

4. A device for transmitting rotary motion as defined in claim 3 wherein said tube deforming means comprises:
an elliptical cam mounted in the outer end of said first tube portion, said cam having its widest dimension exceeding the diameter of said first tube portion and deforming said outer end of said first tube portion into an elliptical shape; and said output member comprises:
spaced rollers mounted in the outer end of said second tube portion in such a manner that said outer end of said second tube portion is deformed into an elliptical shape lying at right angles to the elliptical shape formed by said cam.

5. A force transmitting device comprising:
a tubular member;
means rigidly affixed in encircling engagement with said tubular member intermediate its ends for peripherally restraining said tubular member;
tube deforming rollers engaging one end of said tubular member in such a manner that said one end is deformed into a non-cylindrical shape progressively about said one end when said rollers are revolved about said one end; and
means mounted adjacent the other end of said tubular member for rotation by a stress transmitted through said tubular member by said rollers.

6. A device for transmitting force and motion through a continuous boundary wall comprising:
a tubular member extending through said wall and being rigidly affixed thereto intermediate its ends;
a first plurality of rollers mounted in one end of said tubular member for deforming said one end;
driving means connected to said first rollers for revolving said first rollers about the inner periphery of said one end;
a second plurality of rollers mounted in the other end of said tubular member and adapted to be revolved about the inner periphery of said other end by deflection of said other end caused by the revolving of said first rollers in said first end of said tubular member;
pins connecting each of said second rollers to a block;
a U-shaped bail having its legs connected to opposed ends of said block;
a nut rigidly affixed to said bail in axial alignment with said tubular member;
a threaded shaft threadedly engaging said nut; and
slidable means restraining said shaft against rotation.

7. A force transmitting device comprising:
a tubular member;
means affixed to said tubular member intermediate its ends for peripherally restraining said tubular member;
tube deforming means mounted adjacent one end of said tubular member for progressively deforming said one end about its periphery, whereby a stress is transmitted through said tubular member to produce a progressive deformation about the periphery of the other end of said tubular member; and
means engaging said other end for converting the progressive deformation thereof into an output movement.

8. The force transmitting device of claim 7 wherein said tubular member is cylindrical and said tube deforming means is substantially oval shaped.

9. The force transmitting device of claim 7 wherein said affixed means comprises a diaphragm member encompassing said tubular member at its midsection.

10. The force transmitting device of claim 9 wherein said affixed means includes a disc member mounted in said tubular member at its midsection for forming an impervious barrier inside said tubular member.

11. A force transmitting device for transmitting a force from one said of an affixing means to the other side thereof by deformation of a hollow member mounted by said affixing means, said device comprising said affixing means and said hollow member, said hollow member having a longitudinal extent and a flexible wall with the hollow member extending through the affixing means from one side thereof to the other and affixed to the affixing means intermediate the ends of the hollow member;
deforming means located on one side of said affixing means for progressively deforming said member about its periphery whereby a stress is transmitted through said member to produce a progressive deformation about the periphery of said member on the other side of said affixing means; and
means engaging said other side of said member for converting the progressive deformation thereof into an output movement.

References Cited in the file of this patent

UNITED STATES PATENTS

| | | |
|---|---|---|
| 2,545,562 | Thiel | Mar. 20, 1952 |
| 2,610,525 | Sprigg | Sept. 16, 1952 |
| 2,943,495 | Musser | July 5, 1960 |
| 3,088,333 | Musser | May 7, 1963 |
| 3,091,979 | Schaefer et al. | June 4, 1963 |

OTHER REFERENCES

Musser: A New Look at Elastic—Body Mechanics From Machine Design, April 15, 1961; pp. 151–156.